Oct. 12, 1926.
G. R. ANDERSON
DRIER
Filed June 11, 1923
1,603,103
3 Sheets-Sheet 2
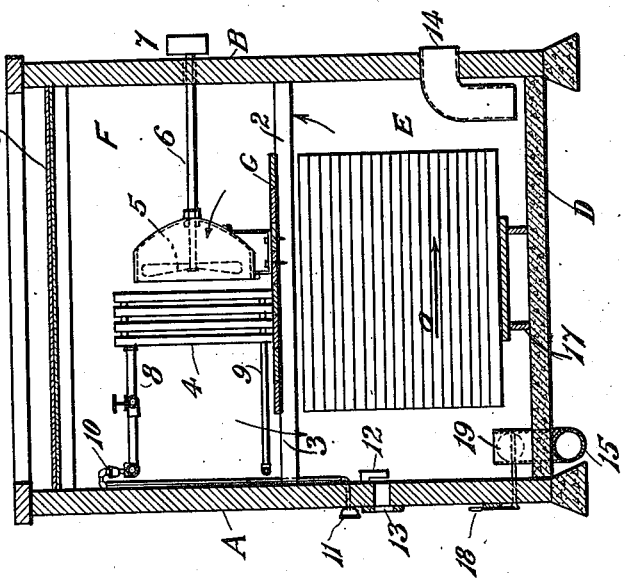
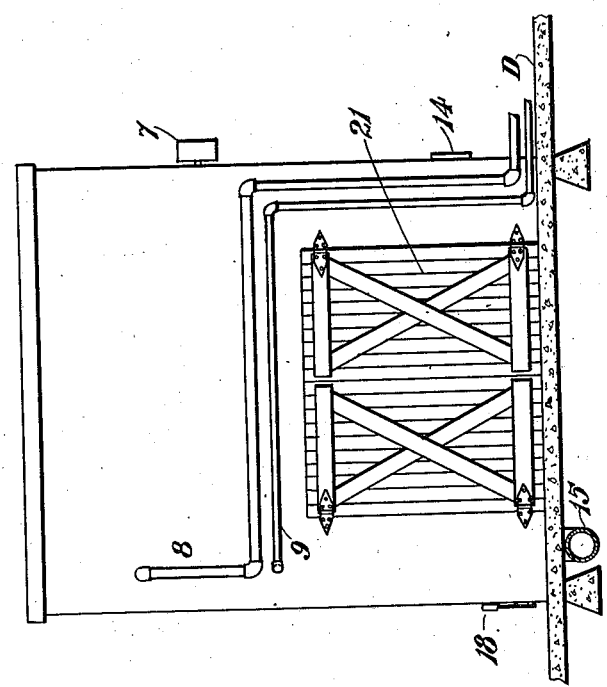
INVENTOR.
GEORGE R ANDERSON
BY Dewey, Strong,
Townsend and Loftus
ATTORNEYS.

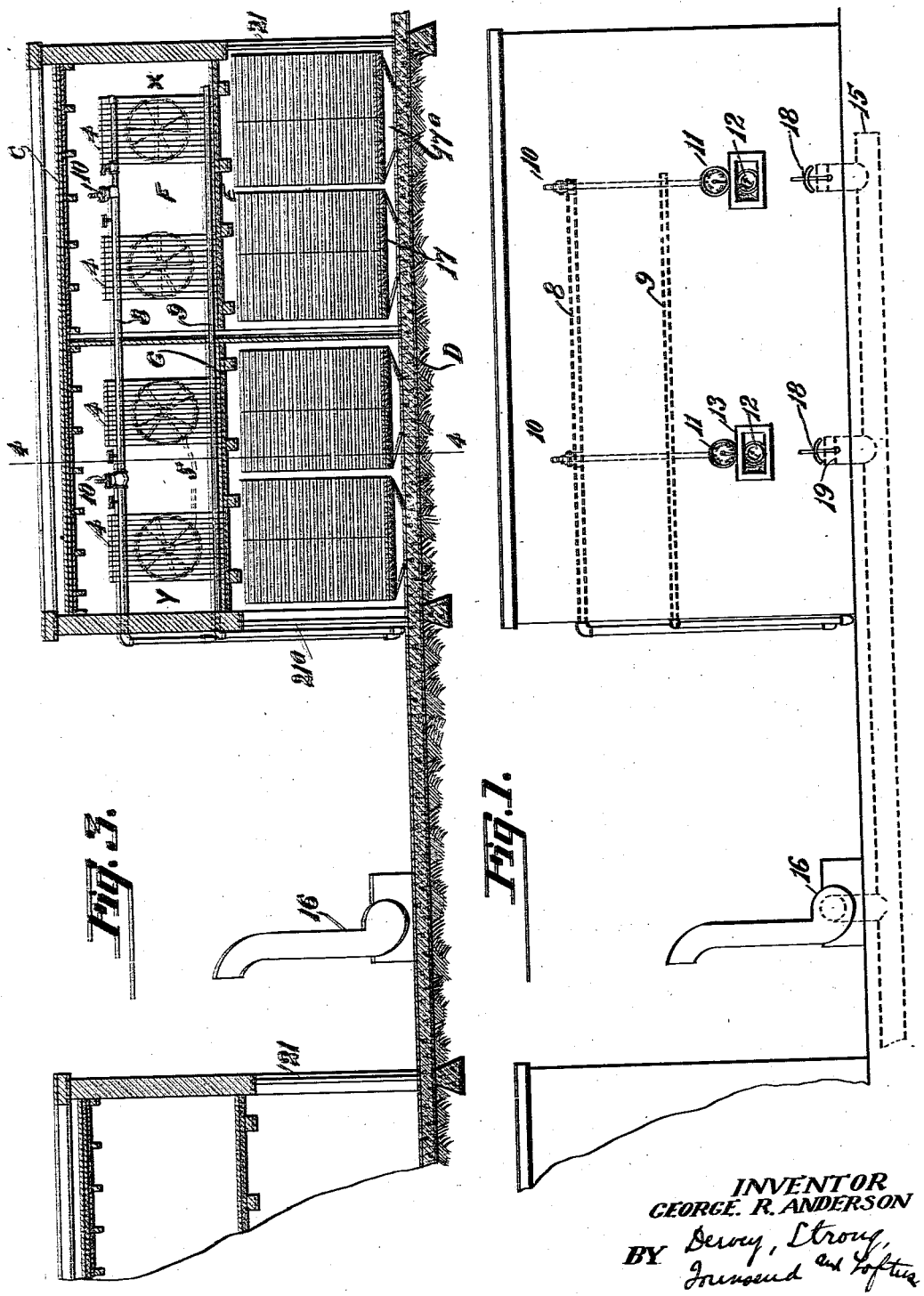

Oct. 12, 1926.

G. R. ANDERSON 1,603,103

DRIER

Filed June 11, 1923

Inventor.
George R. Anderson.
By Dewey, Strong, Townsend & Loftus.
Attorneys.

Patented Oct. 12, 1926.

1,603,103

UNITED STATES PATENT OFFICE.

GEORGE R. ANDERSON, OF SANTA ROSA, CALIFORNIA.

DRIER.

Application filed June 11, 1923. Serial No. 644,541.

This invention relates to driers or dehydrators such as are employed for the purpose of drying fruit, vegetables and other products, and especially to that type of drier known as a single compartment drier.

From actual experience and close observation while experimenting with so called artificial or hot air drying of fruit, vegetables, etc., it has been found that if a high grade dried fruit or vegetable is desired, when taste, appearance and keeping qualities are to be considered, that each variety of fruit or vegetable requires a different drying condition in regard to temperature, humidity content of the air, and so on. For instance certain fruits should be subjected to air of a gradual increase in temperature during the beginning of the drying operation and, similarly, to a gradual decrease in temperature during the finishing of the drying operation. Other fruits require that the humidity or moisture content of the air must be carefully regulated to obtain the best results, and it is very important that the velocity and direction of the flowing air currents be carefully regulated to obtain a uniform product. It has been found, when handling certain fruits, that if too much moisture is present in the air, fermentation is liable to start and once started, even though very slight, often causes spoiling of the fruit at a later date. In other instances, if the temperature of the air at the beginning of the drying operation is too great the fruit bursts or cracks, allowing the fruit juices to run out and as such produces a product of inferior appearance and low sugar content. Again, if the air employed is too dry it causes the peel of the fruit to become hard, producing what is commonly termed "case hardening", and if the fruit does become case hardened, it is difficult to further dry the same as the moisture content is only liberated with difficulty. It has also been found that when certain fruits have once started drying, that is, after they begin to shrink and have liberated a certain amount of moisture, that the temperature can be gradually increased, but care must be taken when employing higher temperatures to carefully regulate the moisture content as detrimental results are otherwise obtained.

The drier forming the subject matter of the present application embodies certain principles disclosed in my copending application entitled "Drier", filed January 10, 1923, Serial No. 611,757, and reference thereto might therefore be of advantage.

The object of the present invention is to generally improve and simplify the construction and operation of single compartment driers; to provide a drier which may be constructed and sold at a reasonable price, rendering it available for the smaller producers, and which is also adapted for large and small scale operation; a drier which may be built in single or multiple units; a drier which can take care of practically every condition encountered in the drying of fruit, vegetables, etc., such as temperature variations, humidity control, and rapid or gradual changes of both or either temperature or humidity content, and which is capable of handling practically any variety of fruit, vegetables, or other products, regardless of variety, quality, size or otherwise. Other objects will hereinafter appear.

One form of which my invention may assume is exemplified in the following description and illustrated in the accompanying drawings, in which—

Fig. 1 is a side elevation of the drier.

Fig. 2 is an end view of the same.

Fig. 3 is a central, vertical, longitudinal section.

Fig. 4 is a cross section on line 4—4, Fig. 3.

Figure 5:
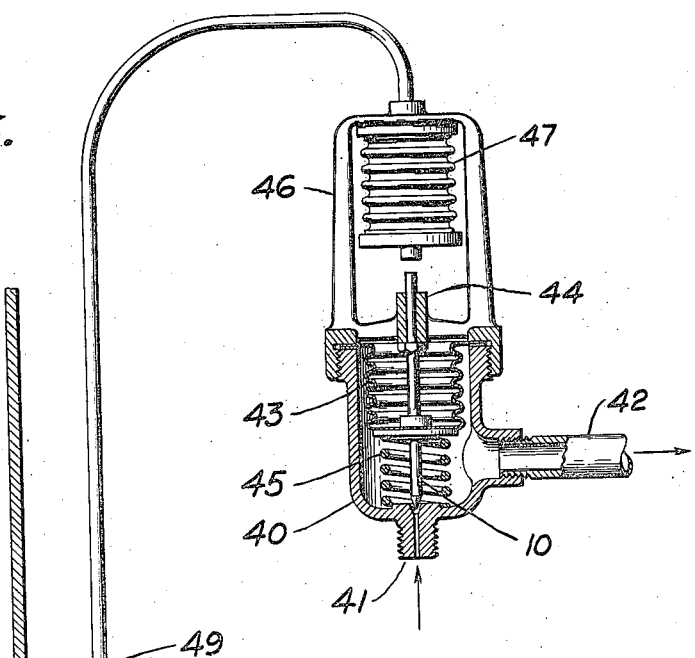
Fig. 5 is a side elevation partially in section showing the thermostat valve 10 and the mechanism or device 11, whereby it is regulated.

Referring to the drawings in detail, and particularly to Figs. 3 and 4, it will be seen that the drier consists of two interpaced side walls such as indicated at A and B. These side walls are connected or tied together by a roof C, and the interior floor indicated at D is constructed of concrete or the like and presents a smooth surface. The compartment formed within the housing is divided into two compartments such as indicated at E and F by means of a central horizontally disposed partition G. Communication is maintained between the compartments E and F through means of end openings as indicated at 2 and 3. Mounted in the upper compartment is a steam radiator 4 and disposed in front thereof is a fan or blower 5 driven in any suitable manner or as here illustrated by means of a shaft 6 and an exterior pulley 7. Steam is delivered to the radiator from any suitable source through means of a pipe 8 and the condensate is removed through a pipe 9. A thermostat actuated valve 10 regulates the flow of steam through the radiator and a thermostat regulator 11 mounted on the side of the building is employed to regulate the thermostat valve 10. The building is also provided with a hygrometer as indicated at 12 of any suitable construction, which is placed on the interior wall of a building in front of a window 13 from where it can be observed from the exterior. The lower compartment E is provided with an air inlet pipe 14 and it is also provided with an exit or exhausting pipe 15; this pipe being referred to as an exhausting pipe as it is connected with the suction side of a blower generally indicated at 16, (see Fig. 1).

For the purpose of readily introducing the fruit and removing the same from the drying compartment E a series of loading platforms such as indicated at 17 are employed. These platforms are handled by a special form of truck which may be passed in under the platform to raise the same and support it when a load is to be moved from place to place; the truck being similarly capable of being lowered to release the platform with its load when it has reached its destination; that is, we will assume that prunes are being handled. If this is the case, it should be appreciated that they require considerable rehandling and transferring from place to place. For instance it is first necessary to dip the prunes in a lye solution to slightly crack the peel or skin as this materially promotes the drying action. It is then necessary to spread the prunes on drying trays; then to stack the trays on the platforms; then to run the loaded platforms into the driers; then to remove them and haul the same to the storage bins, etc. Many drying plants are so arranged that the trays may be stacked on cars and the cars moved on tracks, but such an installation is naturally costly and is entirely avoided in this instance as it is only necessary to form concrete or wooden runways for trucks such as here employed. The operation will be as follows:

A number of trays are stacked upon a platform such as indicated at 17, (see Fig. 4) and the trays are, of course, interspaced and loaded with ripe fruit to be dried, such as prunes, pears, peaches, etc. We will suppose that it is first desired to subject the fruit to air, having a temperature of 110 degrees F., and also that it is desired to maintain a certain humidity content, as far as the drying air is concerned. If this is the case, the operator regulates the device indicated at 11 and sets the same at 110 degrees F. The device 11 regulates the thermostat valve 10 and this in turn admits steam to the radiator in such quantities as to cause the air within the drying compartment to assume a temperature of 110 degrees F. The blower is simultaneously set in operation and the air will, therefore, flow through the trays in the direction of arrow $a$; then up through the opening 2, as indicated by the arrow; then through the fan and the radiator 4, and finally down through the opening 3 and through the trays as previously stated. The air will continue to circulate and circulate and the temperature of 110 degrees will be automatically maintained. When the air has picked up a certain amount of moisture or, in other words, that liberated by the fruit and the humidity content of the air exceeds a predetermined point, the operator merely looks through the window 13 as the amount of humidity or moisture carried by the air can then be observed by looking at the hygrometer 12. In other words, the hygrometer is observed from time to time and if the moisture content is a little too great, he merely grasps a lever such as indicated at 18 and swings it in a direction which will cause a damper 19 disposed in pipe 15 to partially open. This means that a certain amount of the air contained in the drying compartment will be withdrawn through the pipe 15 as this is connected with the suction side of the blower 16, and it also means that a similar or a proportional amount of fresh dry air from the exterior atmosphere will enter through the pipe 14 as the drying compartment immediately assumes a slight evacuated condition the moment damper 19 is opened. The operator maintains the damper in an open position until the humidity content of the air drops to a desired point and he then closes the damper and does not open the same again until the humidity content begins to become excessive. In other words, the control of the humidity content is manually taken care of by the operator and he must, therefore, keep the hygrometer under observation from time to time. The temperature of the air is automatically controlled but it may be manually increased or decreased from time to time by regulating the thermostat 11. For instance with a certain kind of fruit it may be desirable to start the drying operation at a fairly low temperature and to increase the temperature gradually and then to finally lower the temperature as the drying operation is being completed. This can, obviously, be accomplished by the present form of drier as the thermostat may be set to obtain a fairly low temperature in the beginning and then gradually adjusted to increase the temperature, and finally adjusted to decrease the temperature as the drying operation is being completed.

One end of the drying compartment is provided with a door as indicated at 21, (see Fig. 2) and this door is naturally opened when a stack of trays is to be admitted. The trays, as previously stated, are loaded on a platform 17 and this is carried by the truck; that is, the trays are loaded on the platform outside of the drier and they are then hauled by the truck into the drying compartment; the truck then being lowered and pulled from under the platform and removed. The trays are, therefore, supported by the platform within the drying chamber during the drying operation and as this is the case the truck may be used for other purposes or for loading other compartments, etc.

In Figs. 1 and 3, I have shown a multiple compartment drier, one compartment being indicated at Y and the other at X. (See Figs. 1 and 3.) I have also shown two steam radiators in Fig. 3, but this is due to the fact that the compartments Y and X are designed to receive two sets of drying platforms as indicated at 17 and 17ª. Each set of steam radiators in the compartment is, however, provided with a common thermostat regulating valve and each compartment is also provided with a single hygrometer; that is, compartments Y and X are individually controlled and have their individual doors as indicated at 21 and 21ª through which the tray carrying platforms are admitted and removed. Each drying compartment is identical in construction and the controls employed are identical, therefore the description of one should suffice. I furthermore wish it understood that while a multiple drying unit is here shown that additional units or a single unit may be built if desired as each unit is individually controlled and operated. This feature is important as it permits either the small or large grower to install the same kind of a plant. If the crop of one farmer is small, a single compartment drier will be sufficient, but if the crop is large, it will probably be necessary to install two or more units.

I also wish it understood that while the present invention is more or less specifically illustrated, that various changes in form and proportion may be resorted to within the scope of the appended claims; similarly, that the materials and finish of the several parts employed may be such as the experience and judgment of the manufacturer may dictate or various uses may demand.

It should also be noted that the pipe 14 is at all times open to the atmosphere. This is an important feature as it simplifies the construction and furthermore automatically maintains atmospheric pressure within the drying chamber; that is, the moment damper 19 is opened, the chamber becomes slightly evacuated, but this is only momentary as air will immediately enter through pipe 14 and relieve the evacuated condition; similarly, when damper 19 is closed no air escapes through the pipe 14 as the atmospheric pressures interior and exterior of the building are equal.

Figure 6:
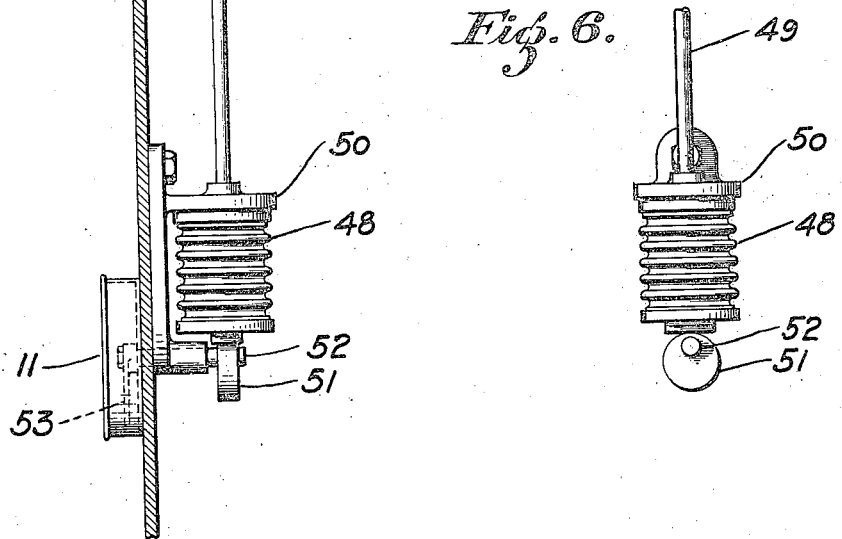
Fig. 6 is an end view of the cam 51 and the mechanism actuated thereby.

For the purpose of clearly disclosing the operation of the regulator 11 and the valve 10 actuated thereby, the following description should be considered, particular reference being made to Figs. 5 and 6. Referring to Fig. 5, 10 indicates the valve, 40 the casing in which it is mounted, 41 the steam inlet connection, and 42 the steam outlet connection which leads to the radiator. To permit the valve to act as sensitively as possible, and to prevent leakage of steam, a corrugated flexible tube 43 is employed as a closure for the upper end of the valve casing. The valve stem passes through this corrugated flexible tube and it is guided at its upper end by a bearing 44 through which it projects. A spring 45, interposed between the casing and the flexible tube, normally serves the function of maintaining the valve in an open position; thus, when the drier is cold, steam will flow through the thermostat actuated valve when it is turned on from the boiler plant. Mounted above the valve casing 40 and supported by brackets or the like, as indicated at 46, is a flexible corrugated tube 47. Mounted on the inside of the wall of the drier in alignment with the device 11 is a second corrugated flexible tube 48. These tubes are connected by a small copper pipe or tube such as indicated at 49; the tube 49 and the corrugated tubes 47 and 48 being filled with a liquid, such as alcohol, ether or the like, which will expand when the drier becomes heated. The tube 48 is secured to a bracket 50 and the lower end of the tube 48 is engaged by a cam 51 (see Figs. 1 and 2) which is secured on a shaft 52. This shaft extends through the casing or device 11 and is provided with a lever 53 which at the same time serves as an indicator. The inner surface of the casing or device 11 may be graduated to indicate degrees of temperature. When the apparatus is cold, it will be assumed that the lowest portion of the cam 51 will engage the lower end of the tube 48 and that the tube 47 will assume a contracted position so that its lower end does not engage the valve stem 10. When steam is turned on, valve 10 is open and the steam will thus flow through the radiator and heat the same, and if fan 5 is operating, the air will be circulated through the drier and the air will gradually assume a uniform temperature. If a high temperature is desired, cam 51 is not turned. The high temperature which is gradually produced will finally cause the liquid in the tubes 47, 48 and 49 to expand and the lower end of the tube 47 will thus engage the upper end of the valve stem 10 and force it towards a closed position. If it is desired to maintain a lower temperature, cam 51 is turned by means of lever 53 and tube 48 is thus mechanically compressed. Tube 47 will at the same time become extended a proportional amount and its lower end will thus be closer to the upper end of the valve stem 10. Hence, a lower temperature will affect expansion of the liquid and will thus cause the valve 10 to close at an earlier period. In other words, the movement of the tube 47 is controlled by two factors, one being manual and the other automatic. By manually compressing the tube 48 through means of the cam and the lever, tube 47 is extended and thus assumes a closer position with relation to the valve stem, where it will actuate the same when expanded by an increase in temperature. Fig. 6 on the sketch is merely an end view of the cam showing that rotation thereof will expand or contract the tube 48.

Having thus described my invention, what I claim and desire to secure by Letters Patent is—

1. A drier of the character described comprising a housing, a partition in the housing dividing it into two compartments, said partition having an opening formed in each end whereby communication is maintained between the compartments, a steam radiator disposed in one compartment, a circulating fan cooperating therewith and maintaining a constant circulation and flow of air through the radiator, the openings in the partition and the respective compartments, a thermostat controlled valve regulating the flow of steam through the radiator and maintaining the air at a predetermined temperature, means for regulating the thermostat and the valve actuated thereby to increase or decrease the air temperature, and manually controlled means operable from the exterior of the drier for actuating said last named means.

2. A drier of the character described comprising a housing, a partition in the housing dividing it into two compartments, said partition having an opening formed in each end whereby communication is maintained between the compartments, a steam radiator disposed in one compartment, a circulating fan cooperating therewith and maintaining a constant circulation and flow of air through the radiator, the openings in the partition and the respective compartments, a thermostat controlled valve regulating the flow of steam through the radiator and maintaining the air at a predetermined temperature, manually controlled means operable from the exterior of the drier for regulating the thermostat and the valve actuated thereby to increase or decrease the air temperature, and manually controlled means operable from the exterior of the drier for regulating the humidity content of the air.

3. A drier of the character described comprising a housing, a partition in the housing dividing it into two compartments, said partition having an opening formed in each end whereby communication is maintained between the compartments, air heating means in one compartment, means for maintaining a constant circulation and flow of air through the heating means, the openings in the partition and the respective compartments, manually controlled means exerting an evacuating effect to remove air from the compartments, and means for admitting fresh air to replace removed air, and to maintain atmospheric pressure in the compartments.

4. A drier of the character described comprising a housing, a partition in the housing dividing it into two compartments, said partition having an opening formed in each end whereby communication is maintained between the compartments, air heating means in one compartment, circulating means maintaining a constant flow of air through the compartments, an air exhausting pipe connected with one compartment, a damper in said pipe, manually controlled means for opening and closing the same, and an air inlet pipe connected with one of the compartments and in constant communication with the exterior atmosphere and with the interior of the drier.

5. A drier of the character described comprising a plurality of drying compartments, a common air exhausting pipe, pipes leading therefrom to each drying compartment, a damper in each of said last named pipes, manually controlled means for opening or closing any damper, and means permitting replacement of air and maintenance of atmospheric pressure in each drying compartment when a damper is opened and air is withdrawn.

6. A drier of the character described comprising a plurality of drying compartments, a common air exhausting pipe, pipes leading therefrom to each drying compartment, a damper in each of said last named pipes, manually controlled means for opening or closing any damper, and an air inlet pipe connected with each compartment, said air inlet pipes forming constant communication between the exterior atmosphere and the interior of the respective compartments and adapted to replace the air exhausted when a damper is opened, and similarly maintaining atmospheric pressure in each drying compartment.

7. In a drier of the character described, a housing having a drying chamber formed therein, means for heating and circulating air through said compartment, means for regulating the humidity content of the air, said means comprising an air exhausting pipe connected with the compartment, manually controlled means for removing air from the compartment through said pipe, and means for admitting a proportional amount of fresh air to replace the air withdrawn.

8. In a drier of the character described, a housing having a drying chamber formed therein, means for heating and circulating air through said compartment, means for regulating the humidity content of the air, said means comprising an air exhausting pipe connected with the compartment, a damper in said pipe, means for manually opening and closing said damper, and an air inlet pipe connected with said compartment and forming constant communication between the exterior atmosphere and said compartment, said pipe admitting fresh air to replace the air removed by the exhausting pipe and also maintaining atmospheric pressure in the drying compartment.

GEORGE R. ANDERSON.